US009780868B2

United States Patent
Costantini et al.

(10) Patent No.: US 9,780,868 B2
(45) Date of Patent: Oct. 3, 2017

(54) SECURITY MONITORING FOR OPTICAL NETWORK

(71) Applicant: Telefonaktiebolaget L M Ericsson (publ), Stockholm (SE)

(72) Inventors: Matteo Costantini, Genoa (IT); Roberto Magri, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 100 days.

(21) Appl. No.: 14/897,528

(22) PCT Filed: Jun. 11, 2013

(86) PCT No.: PCT/EP2013/062020
§ 371 (c)(1),
(2) Date: Dec. 10, 2015

(87) PCT Pub. No.: WO2014/198298
PCT Pub. Date: Dec. 18, 2014

(65) Prior Publication Data
US 2016/0119056 A1    Apr. 28, 2016

(51) Int. Cl.
*H04B 10/07*     (2013.01)
*H04L 29/06*     (2006.01)
(Continued)

(52) U.S. Cl.
CPC ......... *H04B 10/0705* (2013.01); *H04B 10/85* (2013.01); *H04J 14/0212* (2013.01);
(Continued)

(58) Field of Classification Search
CPC . H04B 10/0705; H04L 63/10; H04L 63/1425; H04L 63/1416
(Continued)

(56) References Cited

U.S. PATENT DOCUMENTS 3,566,128 A * 2/1971 Arnuad ............ H01S 3/08
359/346
5,887,243 A * 3/1999 Harvey ............ G01R 1/071
348/E5.108
(Continued)

FOREIGN PATENT DOCUMENTS

CN    101809912 A    8/2010
EP    2464035 A1    6/2012
(Continued)

OTHER PUBLICATIONS

ITU-T, "Security architecture for systems providing end-to-end communications", International Telecommunications Union, Standardization Section, X.805, Series X: Date Networks and Open System Communications, Security, Oct. 2003, 1-28.
(Continued)

*Primary Examiner* — Haresh N Patel
(74) *Attorney, Agent, or Firm* — Murphy, Bilak & Homiller, PLLC

(57) ABSTRACT

Apparatus (10) for an optical communications network has optical paths for optical traffic, and optical ports (20,40), one of which is an unused input port (20). A security monitoring system (30) has a blocking part (50) comprising an interface (51) coupled removably to the unused input port (20) to occupy it to prevent unauthorized access. A light source is optically coupled to the interface (51) such that, when the interface is coupled to the unused input port, light can be transmitted through the interface (51) into the unused input port (20). An optical detector (60) can detect light reflected back from the interface (51), and there is alarm circuitry (70) configured to output an alarm signal based on the detecting of the reflected light. This monitoring can help make the node more secure from interference such as the introduction of a noise signal. The system can be passive or active, and
(Continued)

does not require a change in the installed node configuration and so can be added easily to existing infrastructure.

19 Claims, 11 Drawing Sheets

(51) Int. Cl.
H04B 10/85 (2013.01)
H04J 14/02 (2006.01)
(52) U.S. Cl.
CPC .......... *H04L 63/10* (2013.01); *H04L 63/1416* (2013.01); *H04L 63/1425* (2013.01)
(58) Field of Classification Search
USPC .......................................................... 726/4
See application file for complete search history.

(56) References Cited

U.S. PATENT DOCUMENTS

| | | | |
|---|---|---|---|
| 6,507,012 B1 | 1/2003 | Medard et al. | |
| 7,769,344 B1* | 8/2010 | Harvey | G06Q 30/0251 345/629 |
| 2002/0126351 A1* | 9/2002 | Chung | H04B 10/077 398/29 |
| 2003/0095303 A1 | 5/2003 | Cunningham et al. | |
| 2004/0213566 A1* | 10/2004 | Takanashi | H04B 10/0775 398/32 |
| 2006/0160395 A1* | 7/2006 | Macauley | H04Q 1/136 439/344 |
| 2006/0189353 A1* | 8/2006 | Fujishima | H04W 88/08 455/561 |
| 2008/0166128 A1* | 7/2008 | Toyomaki | H04J 14/02 398/79 |
| 2009/0087194 A1* | 4/2009 | Nakashima | H04B 10/2572 398/158 |
| 2009/0172474 A1* | 7/2009 | Negrete | H04L 41/0681 714/37 |
| 2009/0196603 A1* | 8/2009 | Zhou | H04B 10/0773 398/32 |
| 2010/0021163 A1* | 1/2010 | Shieh | H04B 10/60 398/65 |
| 2012/0093522 A1* | 4/2012 | Qi | H04B 10/2942 398/174 |
| 2012/0166582 A1* | 6/2012 | Binder | H04L 63/18 709/217 |
| 2012/0207475 A1* | 8/2012 | Tian | H04B 10/0779 398/65 |
| 2013/0072112 A1* | 3/2013 | Gunnarsson | H04B 7/2606 455/9 |

FOREIGN PATENT DOCUMENTS

| | | |
|---|---|---|
| WO | 2011103930 A1 | 9/2011 |
| WO | 2013185797 A1 | 12/2013 |

OTHER PUBLICATIONS

Jung, Young J. et al., "Demonstration of 10Gbps, all-optical encryption and decryption system utilizing SOA XOR logic gates", Optical and Quantum Electronics, vol. 40, No. 5-6, Apr. 2008, 425-430.

Rejeb, Ridha et al., "Fault and Attack Management in All-Optical Networks", IEEE Communications Magazine, Topics in Optical Communications, Nov. 2006, 79-86.

* cited by examiner

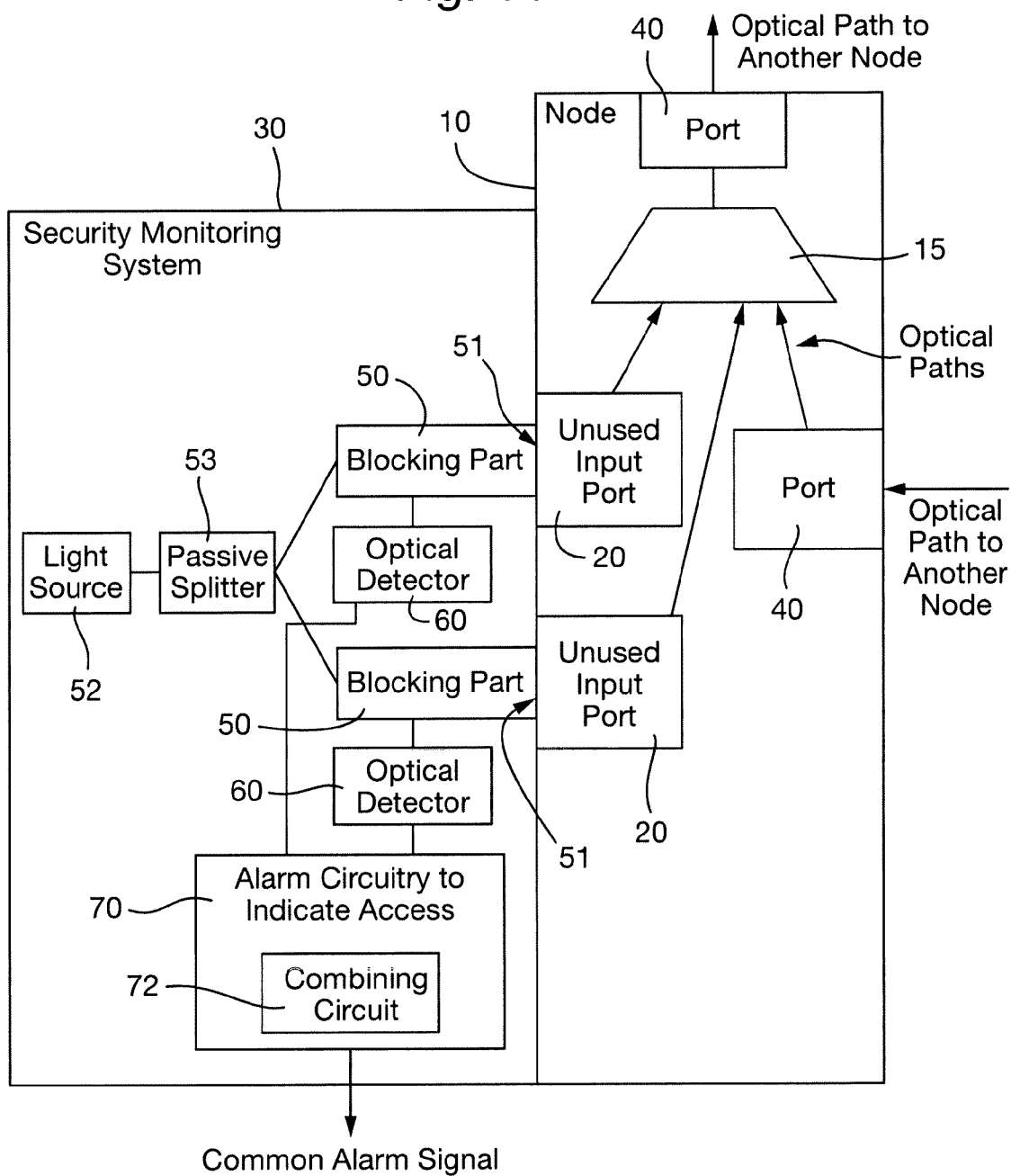

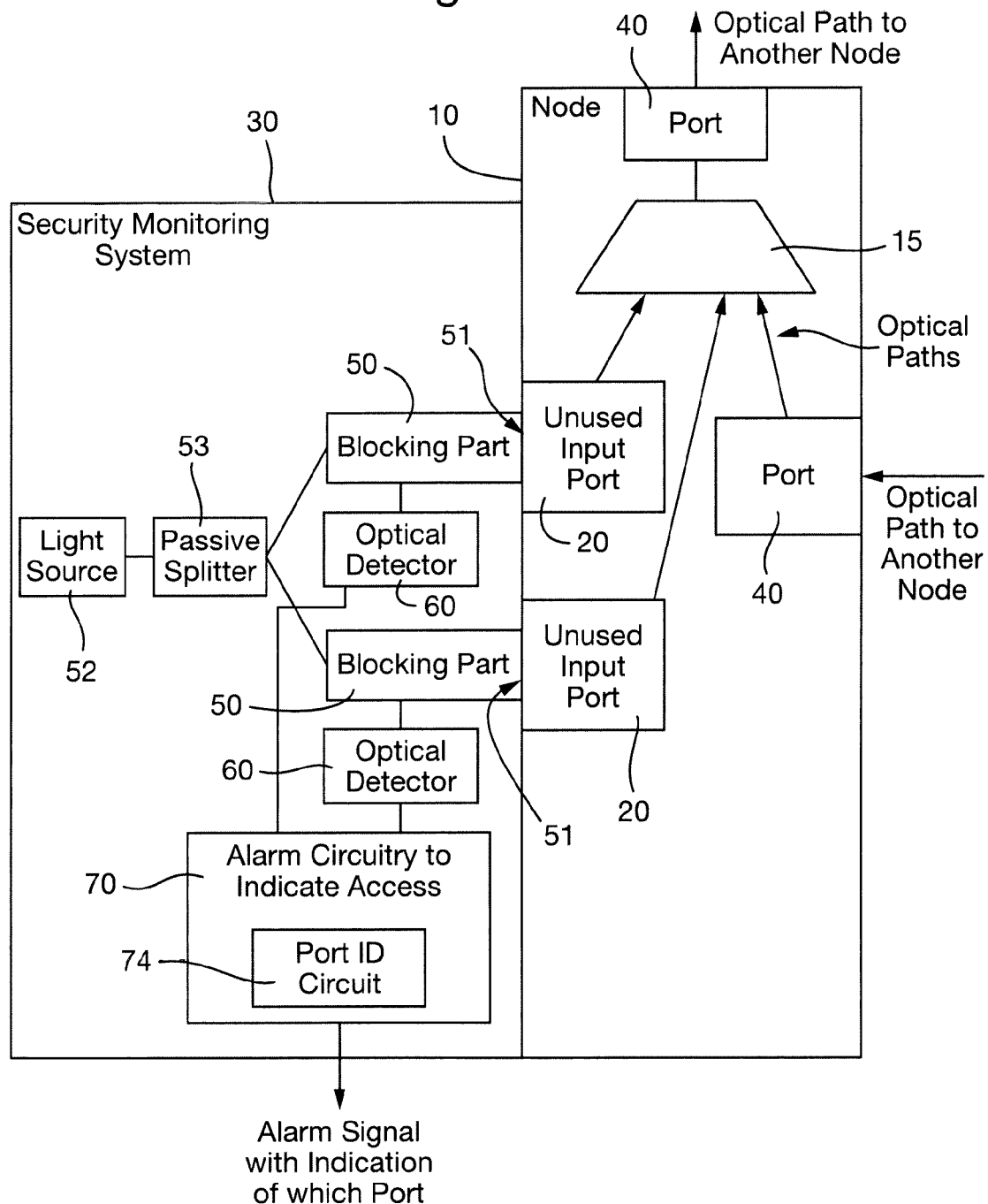

SECURITY MONITORING FOR OPTICAL NETWORK

TECHNICAL FIELD

This invention relates to security monitoring systems for optical networks, to apparatus having such systems, and to corresponding methods of monitoring security, and of installing security monitoring systems.

BACKGROUND

As the demand for network capacity grows, the issue of securing the physical layer of optical network cannot be overlooked. Optical layer security benefits from electromagnetic immunity however the optical layer includes not only fiber spans but also network equipments which are vulnerable to a variety of attacks. This means that optical networks can be almost as easy to tap or to interfere as copper wire based networks.

One approach that has been proposed for providing communications security is optical encryption of the signals transmitted across an optical communications network, as proposed by Jung et al, "Demonstration of 10 Gbps all-optical encryption and decryption system utilizing SOA XOR logic gates", Optical and Quantum Electronics, vol. 40, no. 5-6, April 2008. A problem faced by optical encryption is that optical encryption and decryption devices are required for each wavelength channel at each transmitter and receiver within a communications network, raising the cost of the network.

One known approach shown in WO2011103930 is concerned with the vulnerability of optical monitoring points in the communications network. These monitoring points are intended for monitoring optical spectrum and power but may be vulnerable to unauthorised eavesdropping. They typically comprise an optical splitter arranged to extract between 1% and 10% of the optical signal that is to be monitored, the extracted signal being provided to a monitoring port. All of the traffic carried by the optical signal being monitored is replicated in the extracted signal and is provided to the monitoring port. There is a resulting problem that live traffic is vulnerable to eavesdropping at the monitoring port and this presents a problem of communications network security.

International Telecommunications Union document ITU-T X.805 "Security architecture for systems providing end-to-end communications" sets out various optical protection schemes for making an optical connection secure against a fibre being cut to place an in-line tap for eavesdropping. However, the methods set out in ITU-T X.805 only monitor cuts in an optical communications network fibre link and are not able to detect eavesdropping of an optical signal via a monitoring port.

Optical signal transforming apparatus is arranged to receive the tapped signal and to apply an optical transfer function to the tapped signal to form an optical monitoring signal. The optical transfer function is arranged to preserve the spectral property of the tapped signal and to apply a time-domain obfuscation to the tapped signal. The optical signal transforming apparatus is further arranged to provide the optical monitoring signal to the monitoring port. Thus an optical monitoring signal from an input optical signal or an output optical signal may be formed on which the traffic is obfuscated in the time-domain and in which a spectral property of the input optical signal or the output optical signal is preserved. Therefore it becomes difficult or impossible for traffic on the input signal or the output signal to be intercepted by eavesdropping on the optical monitoring signal, without the need for encryption of each wavelength channel.

SUMMARY

In the Applicant's earlier unpublished patent application PCT/EP2012/060996 the Applicant describes a security monitoring system for detecting unauthorised access of unused output ports. This security monitoring system comprises a blocking part coupled removably to the unused output port to occupy the unused output port so as to exclude any other part from using the unused output port to gain unauthorised access to the optical path of the unused output port. An optical detector is coupled to the blocking part and configured to detect optical signals passing through the unused output port. There is also alarm circuitry configured to output an alarm signal indicative that the unused output port has been accessed based on the detecting of the optical signals by the optical detector. For example, an alarm signal may be output if a break in the optical signals is sensed, indicating that the blocking part may have been removed from the unused output port and so unauthorised access may have occurred. This security monitoring system has the advantage that unused output ports can be made more secure from interference or from eavesdropping.

However, this security monitoring system cannot be used to detect unauthorised access to unused input ports, from which there are no output optical signals. Unused input ports cannot be used to access or tap optical traffic. However, the Applicant has appreciated that nonetheless it would be desirable to protect unused input ports from unauthorised access, since these ports can be used to introduce interference signals which can disrupt signal traffic.

Embodiments of the present invention aim to provide a security monitoring system for detecting unauthorised access of unused input ports.

According to a first aspect of the invention, there is provided apparatus for an optical communications network, the apparatus having at least two optical paths for optical traffic to or from other nodes, the optical paths having respective optical ports, wherein at least one of the optical ports is configured as an unused input port, available for future use for optical traffic. A security monitoring system is provided for detecting unauthorised access and having a blocking part comprising an interface coupled removably to the unused input port to occupy the unused input port so as to exclude any other part from using the unused input port to gain unauthorised access to the optical path of the unused input port. A light source is optically coupled to the interface of the blocking part such that, when the interface is coupled to the unused input port, light can be transmitted through the interface into the unused input port. An optical detector is further arranged to detect light reflected back from the interface of the blocking part. Alarm circuitry is provided configured to output an alarm signal indicative that the unused input port has been accessed based on the detecting of reflected light by the optical detector.

This monitoring can help make the node more secure from interference such as the introduction of noise signals into unused input ports that can disrupt the system traffic. It also enables the monitoring system to be external or more independent of the rest of the node, making it easier to upgrade existing nodes. Compared to other mechanical or physical security measures applied to the entire node or building, this can be simpler, less costly and can be applied selectively so as to secure just part of a node as desired. The novel monitoring is also compatible with such known methods and can thus enable security to be provided at multiple levels for more complete security. These distinctions apply in principle to both internally accessible or external ports, and to any way of making use of the resulting tampering indication.

Any additional features can be added to these features, and some such additional features are set out below and set out in dependent claims and described in more detail.

One such additional feature is that the light source is configured to emit light at a wavelength different from the existing optical traffic in the optical communications network. This is desirable since it ensures that the light input into the unused input port by the security monitoring system does not itself interfere with the optical traffic in the optical communications system.

Another such additional feature is the alarm circuitry being configured to output the alarm signal if the power of the detected reflected light is above a predefined threshold.

Another such additional feature is the node comprising at least one of an optical splitter having an input coupled to the unused input port, and a wavelength multiplexer having an input coupled to the unused input port. These are commonly used components which can result in spare inputs, which therefore can give rise to security vulnerabilities.

Another such additional feature is the at least one unused input port comprising an optical connector, and the blocking part having a corresponding connector suitable to mate with the optical connector. The connector makes it particularly easy to add interference signals, so in this case the added security is particularly useful.

Another such additional feature is the monitoring system having a communications part for sending the alarm signal to a network management part of the network. This can help enable an appropriate response to the detection as the network management system has much information about the state of the network.

Another such additional feature is the alarm circuitry having a latching circuit configured to maintain a persistent indication of a temporary detection of tampering, and a reset circuit for resetting the latching circuit according to an external signal. This can help enable the handling of transient detections.

Another aspect of the invention provides a security monitoring system for coupling to an unused input port of an optical path of apparatus of an optical network, the apparatus having at least two optical paths for optical traffic to or from other nodes, the optical paths having respective optical ports, wherein at least one of the optical ports is configured as an unused input port, available for coupling optical traffic in the future. The security monitoring system is for detecting unauthorised access and has a blocking part comprising an interface for coupling with the unused input port so as to occupy the unused input port. A light source is optically coupled to the interface of the blocking part such that, when the interface is coupled to the unused input port, light can be transmitted through the interface into the unused input port. An optical detector is arranged to detect light reflected back to the blocking part. Alarm circuitry is provided configured to output an alarm signal indicative that the unused input port has been accessed, based on the detecting of reflected light by the optical detector.

Having the monitoring part as an external part is particularly useful to enable use with existing nodes, and to enable use with different types of nodes for example without needing to alter the nodes.

Another such additional feature is the alarm circuitry being configured to output the alarm signal, if the power of the reflected light detected by the optical detector is above a predefined threshold.

Another such additional feature is a communications part for sending the alarm signal to a network management part of the network.

Another such additional feature is the alarm circuitry having a latching circuit for maintaining a persistent indication of a detection, and a reset circuit for resetting the latching circuit according to an external signal.

Another such additional feature is where there are two or more of the blocking parts, for two or more respective unused input ports, the alarm circuitry is configured to output an alarm signal indicating which of the two or more unused input ports has been accessed. This can help in enabling security to be handled on a per port basis, or per group of ports. Thus an alarm indication for one port need not affect all traffic through a node, and thus unnecessary rerouting of traffic can be reduced, and a more detailed picture of security level along a path can be built up.

Another such additional feature is where there are two or more blocking parts, for two or more respective unused input ports and the alarm circuitry being configured to combine outputs of the optical detectors to output a common alarm signal if access to any of the two or more unused input ports is detected. This combining can help reduce the numbers of signals and simplify the arrangement, which can make it more scalable to systems having many unused input ports or many nodes.

Another such additional feature is a passive optical splitter arranged to split the light emitted by the light source into a plurality of portions for coupling to the two or more blocking parts respectively. This way of coupling light to the plurality of blocking parts is cheaper than alternative solutions which require a plurality of light sources, each emitting light for coupling to a respective blocking part.

Another such additional feature is a second blocking part coupled removably to an unused output port of the apparatus, available for future use for optical traffic, to occupy the unused output port so as to exclude any other part from using the unused output port to gain unauthorised access to the optical path of the unused output port; a second optical detector coupled to the second blocking part and configured to detect optical signals passing through the unused output port; and alarm circuitry configured to output an alarm signal indicative that the unused output port has been accessed based on the detecting of the optical signals by the second optical detector. This embodiment has the advantage of providing a single system which can detect both unauthorised access of both unused input and unused output ports.

Another aspect of the invention provides a method of monitoring security of an optical path to detect unauthorised access to the optical path in apparatus of an optical network, the apparatus having at least two optical paths for optical traffic to or from other nodes, the optical paths having respective optical ports, wherein at least one of the optical ports is configured as an unused input port, available for coupling optical traffic in future. There are steps of coupling an interface of a blocking part to the unused input port so as to exclude any other part from using the unused input port to gain unauthorised access to the optical path of the unused input port, transmitting light through the interface into the unused input port, detecting light reflected back from the unused input port, and outputting an alarm signal indicating whether access has occurred based on the detecting of reflected light.

Another additional feature is the step of sensing if the power of the reflected light is above a predefined threshold, and outputting the alarm signal according to the sensing.

Another such additional feature is a step of sending the alarm signal to a network management part of the network.

Another aspect of the invention provides a method of installing a security monitoring system to upgrade apparatus of an optical communications network, the apparatus having at least two optical paths for optical traffic to or from other parts of the network, and having two or more optical ports, wherein at least one of the optical ports is configured as an unused input port, available for coupling optical traffic in future. The security monitoring system is for detecting unauthorised access and has a blocking part comprising an interface suitable to couple removably to the at least one unused input port to occupy the unused input port so as to exclude any other part from using the unused input port to gain unauthorised access to the optical path of the unused input port. There is a light source optically coupled to the interface of the blocking part such that, when the interface is coupled to the unused input port, light can be transmitted through the interface into the unused input port, an optical detector arranged to detect light reflected back from the interface, and alarm circuitry configured to output an alarm signal indicative that the unused input port has been accessed based on the detecting of reflected light by the optical detector. The method of installing the security monitoring system has the steps of coupling the blocking part of the security monitoring system to the unused input port, and providing a communication path for the circuitry of the security monitoring system to communicate the indication to a network management system of the network.

The ability to add monitoring with minimal changes to existing hardware or software of a node is a useful benefit, and makes it an easy upgrade. Hence this claim explicitly covers the upgrading steps without reciting operating steps, nor being limited to a node.

Any of the additional features can be combined together and combined with any of the aspects or be disclaimed from any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

Embodiments of the invention will be described, by way of example only, with reference to the accompanying drawings in which:

FIGS. 11 and 12 show schematic views of apparatus having features in their alarm circuitry;

DETAILED DESCRIPTION

Figure 1:
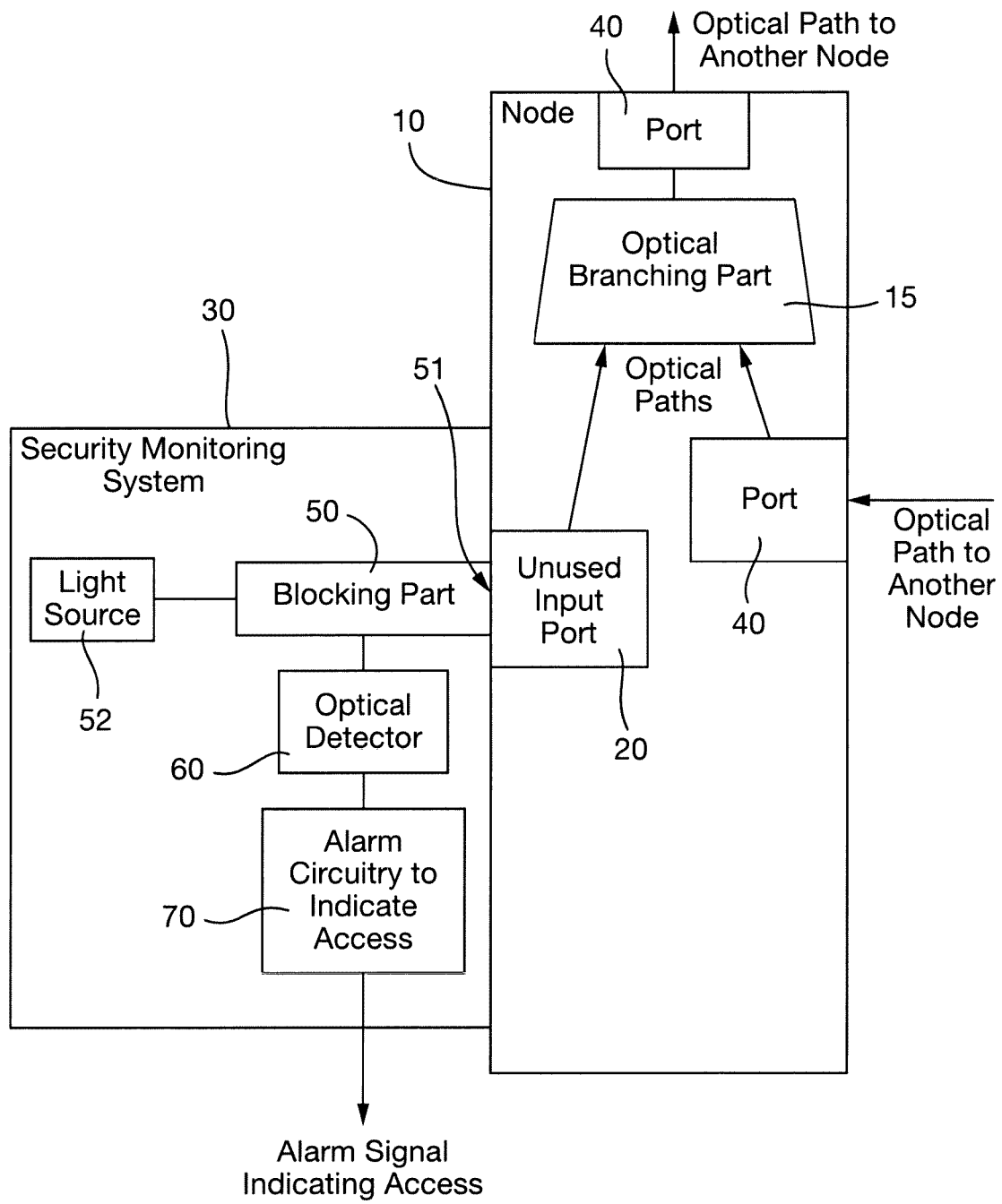
FIG. 1 shows a schematic view of apparatus in the form of a node of an optical network according to a first embodiment

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

Abbreviations:
AD: Analog to Digital Converter
AWG: Array WaveGuide
HW: Hardware
LC Lucent type Connector
LOS: Loss of Signal
MTP: Multi-fiber Termination Push-on (type of connector)
ROADM: Reconfigurable Optical Add Drop Multiplexer
WDM Wavelength Division Multiplexed
WSON Wavelength Switched Optical Network
WSS: Wavelength Selective Switch Definitions:
Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated. Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware. References to nodes can encompass any kind of switching node, not limited to the types described, not limited to any level of integration, or size or bandwidth or bit rate and so on.

References to switches can encompass switches or switch matrices or cross connects of any type, whether or not the switch is capable of processing or dividing or combining the data being switched.

References to programs or software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

The functionality of circuits or circuitry described herein can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Embodiments can have programs in the form of machine-readable instructions (software) which, when executed by a processor, perform any of the described methods. The programs may be stored on an electronic memory device, hard disk, optical disk or other machine-readable storage medium or non-transitory medium. The programs can be downloaded to the storage medium via a network connection.

References to ports are intended to encompass any kind of port, examples include, and are not limited to, optical connectors for internal or external coupling, connectors for coupling between cards and motherboards, fiber tails with no termination, for future splicing, cards having such connectors or fibers and associated circuitry or components, ports provided for monitoring optical spectrum, or for future expansion or reconfiguration, or because the commercially available optical branching components do not provide the desired number of outputs, and so on.

References to access to an optical path are intended to encompass any kind of physical access which could affect optical signals on the optical path, such as connecting to an optical connector or splicing a fiber tail or so that interfering optical signals can be added to the optical path.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

By way of introduction to features of embodiments of the invention, some discussion of known features will be presented. Today's ROADM architectures allow nodes with different functionalities such as the Colored/Colorless, Directionless/Directioned, Contentionless, etc. All these architectures show a certain degree of vulnerability in terms of ease of access to optical unused output ports where the optical signal carrying a large amount of traffic can be tapped or accessed, and also to unused input ports through which for example a noise signal may be introduced which can disrupt system traffic. In particular, no means of detecting the malicious intrusion of unused input ports are available now.

Some of the vulnerable input ports in these architectures include:
WWS unused ports
Passive AWG ports at the add side
Splitter input ports in the add side of the colorless architectures with coherent transponders
N×M block input ports in the contention-less architectures.

Hence there are many unused input ports, unprotected and accessible, available in the current and future node architectures for optical networks, and the current art does not recognise this problem. Reliance is placed on building or room or cabinet security measures. But many customer sites/buildings may not be sufficiently protected against intrusion or access to the equipment so additional means to prevent data access violation are desirable.

Furthermore a method that allows an in-traffic upgrade of the network optical security level is desirable. Most of the units showing vulnerable ports are just passive (splitters, AWG filters, etc) and transforming them to active units would be too onerous and not commercially advantageous. Therefore the need for a different approach with broader protection capabilities has been recognised by the present inventors. This can be based on a 'security guard unit' which provides the capacity of a ROADM node to certify that a port of the node has not been accessed. ROADM architectures show lots of points of 'weakness' and vulnerable points of access for a malicious operator. Currently there is no way for the equipment to detect the access to these many points, and in particular access to unused input ports.

Figure 2:
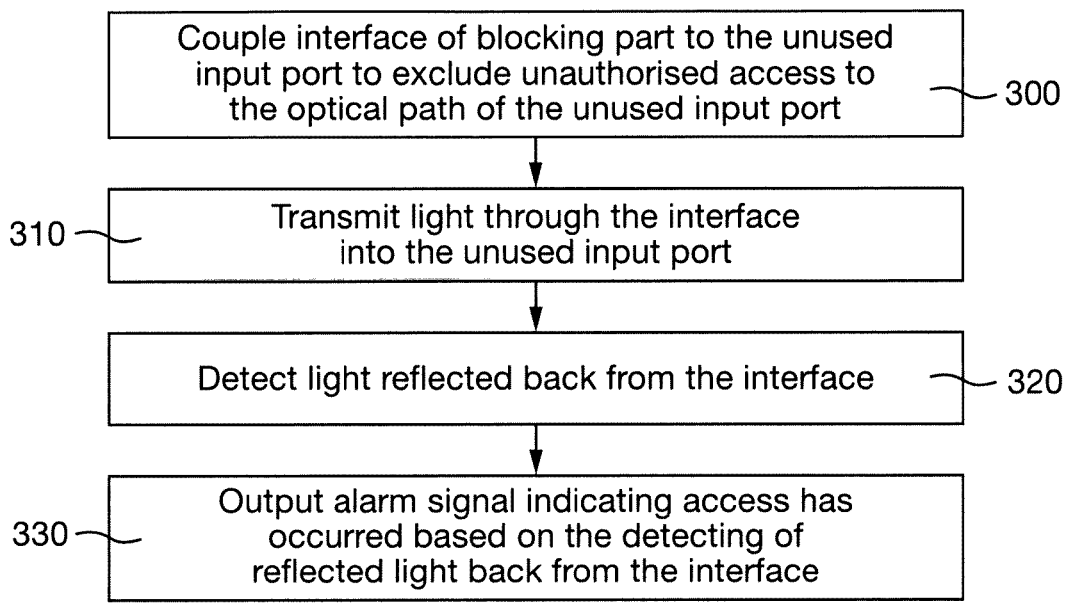
FIG. 2 shows steps in operating a security monitoring system according to an embodiment.

FIGS. 1, 2 a First Embodiment of the Invention

FIG. 1 shows a schematic view of apparatus in the form of a node 10 of an optical network with an external security monitoring system 30. The node has ports 40 occupied by links to other ports. An optical branching part 15 is provided in the form of a combiner or multiplexer for example. Thus, there are two or more optical paths. One of these paths leads from an unused input port 20 to the optical branching part 15. The security monitoring system 30 has a blocking part 50 comprising an interface 51 which is coupled to the unused input port 20 so that it occupies the unused input port so as to prevent unauthorised access, such as the introduction of disturbing signals, to the optical path of the unused input port 20. A light source 52 is optically coupled to the interface 51 of the blocking part 15. When the interface 51 is coupled to the unused input port 20, light emitted by the light source 51 is passed through the interface 51 into the unused input port. Note that when the interface 51 is decoupled from the unused input port 20, light will still be transmitted through the interface but will simply be transmitted into the air.

It is preferred that the light source 51 is configured to emit light at a wavelength different from the existing optical traffic in the optical network, so as to prevent the light which is input into the unused input port 20 being a disturbing signal itself. However, in an alternative embodiment for example, the light emitted by the light source 51 may be at the same wavelength as optical traffic in the optical network but at a power low enough not to interfere with the existing optical traffic. The light source 52 may be a laser source, such as a CWDM source. However, other types of light source 52 may be used, such as for example an LED. The light source 52 may be coupled to the blocking part 50 by any optical path, such as an optical fibre, and may therefore be several meters away from the blocking part 50.

An optical detector 60 is further provided coupled to interface 51 and configured to detect light which is reflected back from the interface 51. As will be appreciated by those skilled in the art, a portion of the light which is transmitted to the interface 51 by the light source 52 will be reflected back from the interface 51 rather than transmitted out through the interface 51 owing to the discontinuity at the interface 51. In a preferred embodiment, the optical detector 60 may be coupled to the optical path connecting the light source 52 to the interface 51 by an optical coupler (not shown) which is configured to pass at least a portion of the light reflected from the interface 51 to optical detector 60.

The monitoring system also has alarm circuitry 70 coupled to the optical detector 60 and configured to output an alarm signal indicative that the unused input port 20 has been accessed based on the detecting of reflected optical light by the optical detector 60.

When the blocking part 50 is coupled or connected to the unused input port 20 such that interface 51 occupies the unused input port 20, as will be appreciated by those skilled in the art, the power of the light reflected back from interface 51 will be determined by the return loss of the components in the unused input port 20. This return loss may typically be for example −35 to 40 dB. Thus, if for example the power of the emitted light at interface 51 is −10 dB, the power of the light reflected back from interface 51 may be −50 dB. On the other hand, if the blocking part 50 is decoupled or disconnected from the unused input port 20, the power of the light reflected back from interface 51 will be determined by the return loss between interface 51, which may for example comprise a fibre optic connector, and the air, which is about −14 dB. Thus, when the blocking part 50 is disconnected from the unused input port 20, the power of the light reflected back from interface 51 will increase. If the power of the emitted light at interface 51 is −10 dB, the power of the light reflected back from interface 51 may be −24 dB.

Thus, by detecting light reflected back from interface 51 it can be determined whether the blocking part 50 has been disconnected from the unused input port, and therefore whether unauthorised access may have occurred.

In a preferred implementation, the power of the reflected light detected by optical detector 60 may be determined and compared to a predetermined threshold value. If the power of the reflected light is above the predetermined threshold value, an alarm signal is output indicative that the unused input port has been accessed. However, other implementations exist. For example, optical detector 60 may be configured to only detect light at a power above a predetermined threshold value. In this case, if the detector 60 detects light, an alarm signal may be output indicative that the unused input port has been accessed.

The proposed security monitoring system or guard unit (which can be a card fitted into the main equipment, or an active frame housed in a pizza box likewise) can have optical detectors implemented as a set of photodiodes to be connected to blocking parts in the form of optical connectors for example to connect to the open unsecure ports of a ROADM node. In this case, there may be a plurality of light sources 52 each emitting light to be input or coupled into a respective unused input port 20. However, more preferably, a passive optical splitter is provided to split light emitted from a single light source 52 into a plurality of portions for input into respective unused input ports. Any opening of such connections for malicious purposes will be instantaneously detected, and an alarm signal can be sent to enable network operators to take opportune counter measures.

This method or apparatus can be applied to current equipment or installed legacy equipment since it can be based on a new add-on unit which does not require changes in the developed equipment cards. Furthermore the unit can be based on low cost devices, and simple low speed electronics and control. The idea is pertinent to ITU-T X.805, addressing non repudiation and access control security dimensions, and the security management plane.

If the ROADM has the required security capability, the security monitoring system can communicate this information, for example indicating the security capability and its current status to the network control and management for any appropriate response, such as warning a human operator, or rerouting sensitive traffic, or updating a routing database for example. Note that the security could be enforced for a part of the node capacity of for a subset of the available directions. In this case of multiple parameters it can communicate for which wavelength and/or for which directions the security is available.

The security monitoring system can be implemented as a card or a pizza box unit with a series of optical connections. In this way the node input ports to be protected against access violation are connected to the input ports of the Security Guard Unit and any disconnection will be detected and signalled to higher level of node or network management.

FIG. 2 shows operating steps according to an embodiment such as that of FIG. 1 or other embodiments. At step 300 the unused input port is blocked by coupling the interface of the blocking part to the unused input port. This occupies the port so as to prevent any unauthorised access to the optical path. At step 310, light is transmitted through the interface of the blocking part into the unused input port. At step 315, an optical detector detects light reflected back from the interface of the blocking part. At step 320, if it is inferred from the detecting of reflected light by the optical detector that the blocking part has been removed or tampered with in some way and thus that unauthorised access has occurred. An alarm signal is output, and this can be used for any purpose, for example to alert an operator, or to reroute traffic, or to update a routing database.

Some effects and consequences of these features described above are as follows:

Can protect against unwanted access to unsecure ports of system node architectures preventing introduction of malicious disturbing signals.

Does not require a change in the installed node configuration: the unit can be added on a live network to upgrade a node to a higher level of security.

No dedicated hardware is required on the traffic card of the nodes.

It can be applicable to passive units as well as more complex active units.

Scalable: it is possible to dimension the unit depending on the number of ports/lines one wants to protect.

Low cost: it can be based on low cost hardware with photodiodes and a laser source, and simple low speed electronics.

Figure 3:
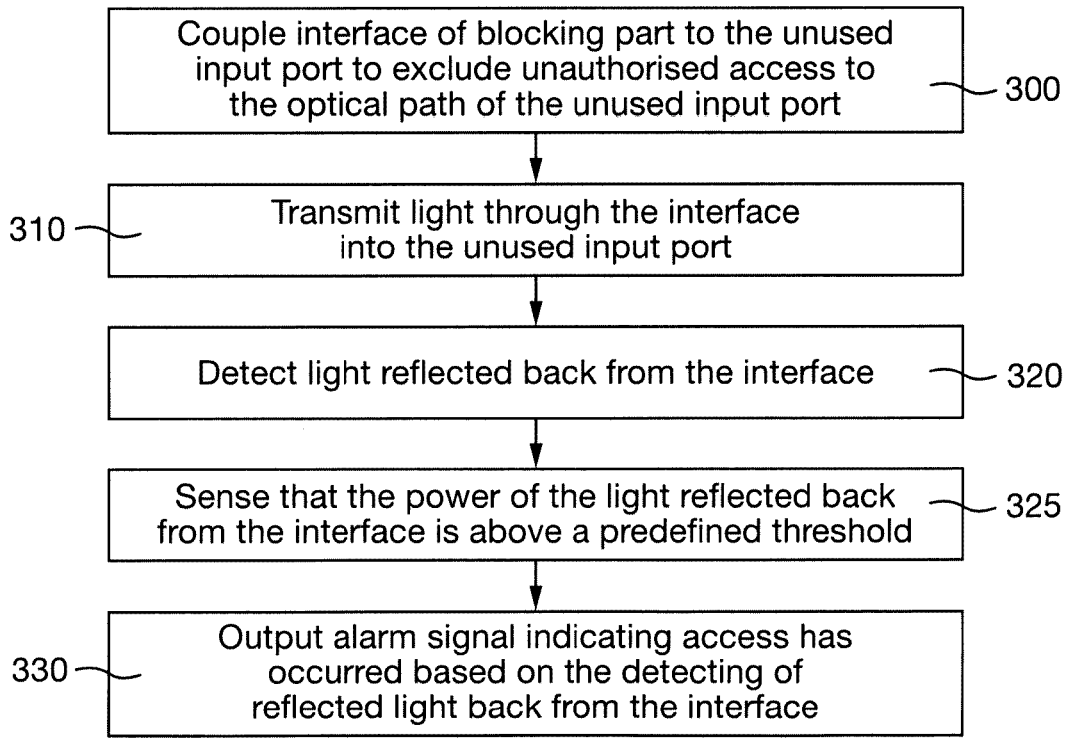
FIG. 3 shows steps in operating a security monitoring system according to an embodiment having monitoring by sensing whether the power of the detected reflected light is above a predefined threshold.

FIG. 3, Embodiment Monitoring by Sensing that the Power of the Reflected Light is Above a Predefined Threshold FIG. 3 shows a method similar to that of FIG. 2 and showing some operating steps of the embodiment of FIG. 1 or other embodiment. At step 300, the unused input port is blocked by coupling the interface of the blocking part to the unused input port. This occupies the port so as to prevent any unauthorised access to the optical path. At step 310, light is transmitted through the interface into the unused input port. At step 315 the optical detector detects light reflected back from the interface. At step 317, it is sensed that the power of the light reflected back from the interface is above a predefined threshold. At step 320, it is inferred that the blocking part has been removed or tampered with in some way and thus that unauthorised access has occurred. An alarm signal is output, and this can be used for any purpose.

Figure 4:
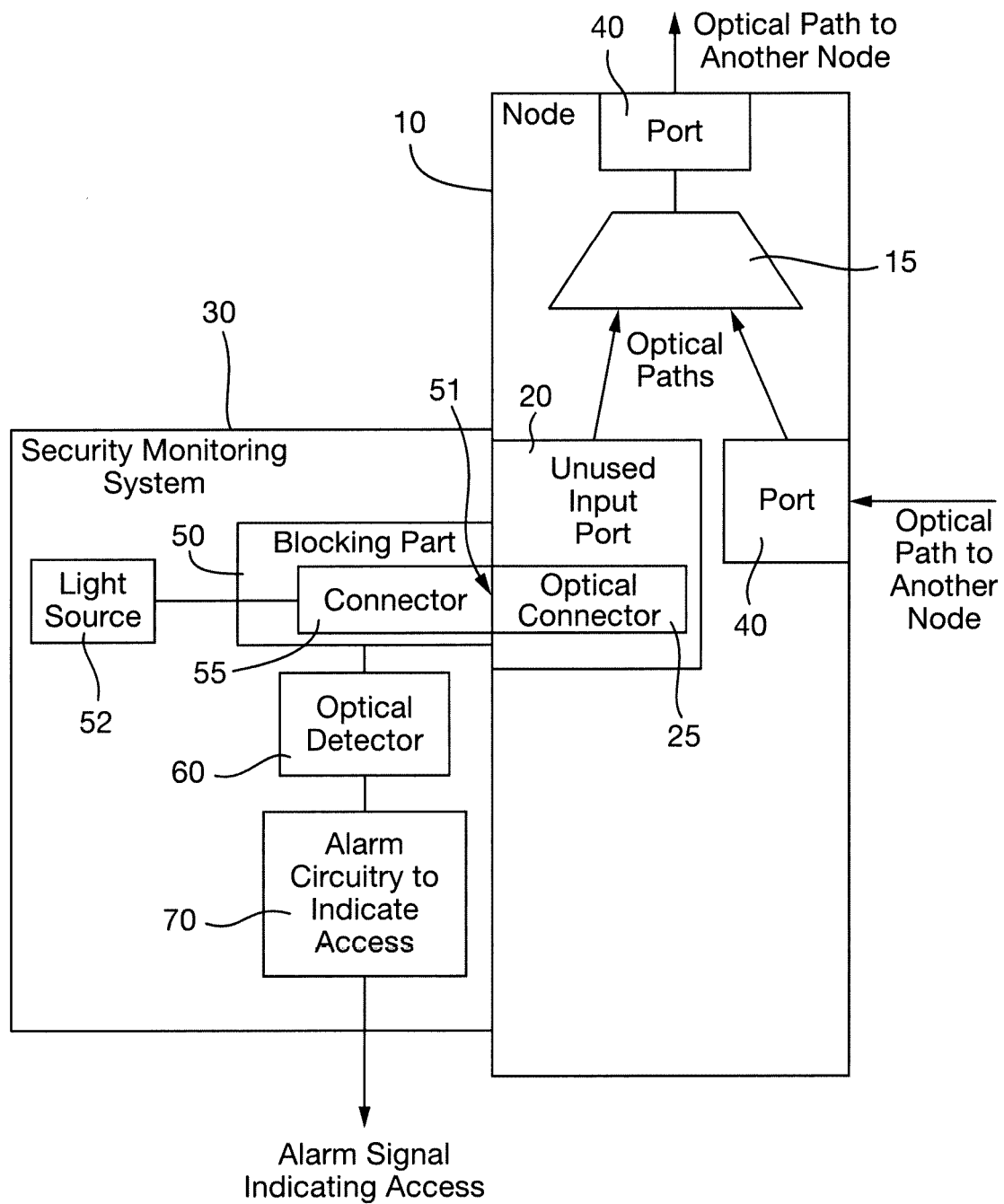
FIG. 4 shows a schematic view of apparatus according to an embodiment having blocking parts for occupying unused optical connectors

FIG. 4 Embodiment Having Blocking Parts for Occupying Unused Optical Connectors FIG. 4 shows an embodiment similar to that of FIG. 1 and similar reference signs are used for corresponding features. In FIG. 4 the unused input port 20 has an optical connector 25 which comprises interface 51. This is coupled to a corresponding connector 55 of the blocking part, so as to occupy the unused port and prevent any other access to the optical path.

Figure 5:
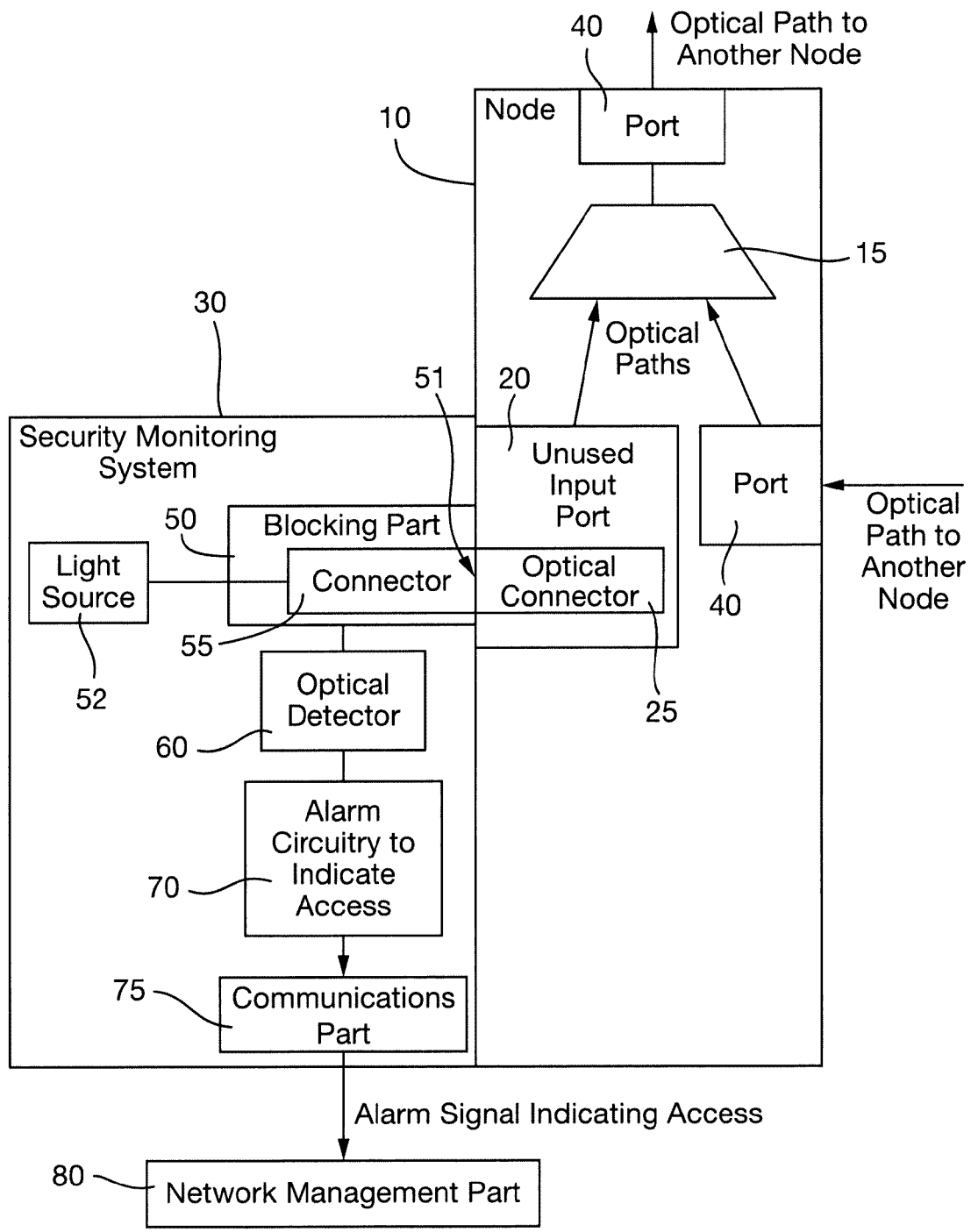
FIG. 5 shows a schematic view of apparatus according to an embodiment having blocking parts for occupying unused optical connectors and a communications part for sending the alarm signal to a network management system.

FIG. 5 Embodiment Having Communications Part for Sending Alarm Signal to NMS FIG. 5 shows an embodiment similar to that of FIG. 4 and similar reference signs are used for corresponding features. In FIG. 5 the unused input port 20 has an optical connector 25. This is coupled to a corresponding connector 55 of the blocking part, so as to occupy the unused port and prevent any other access to the optical path. The security monitoring system has a communications part 75 so that the output alarm signal can be sent to a network management part 80.

Figure 6:
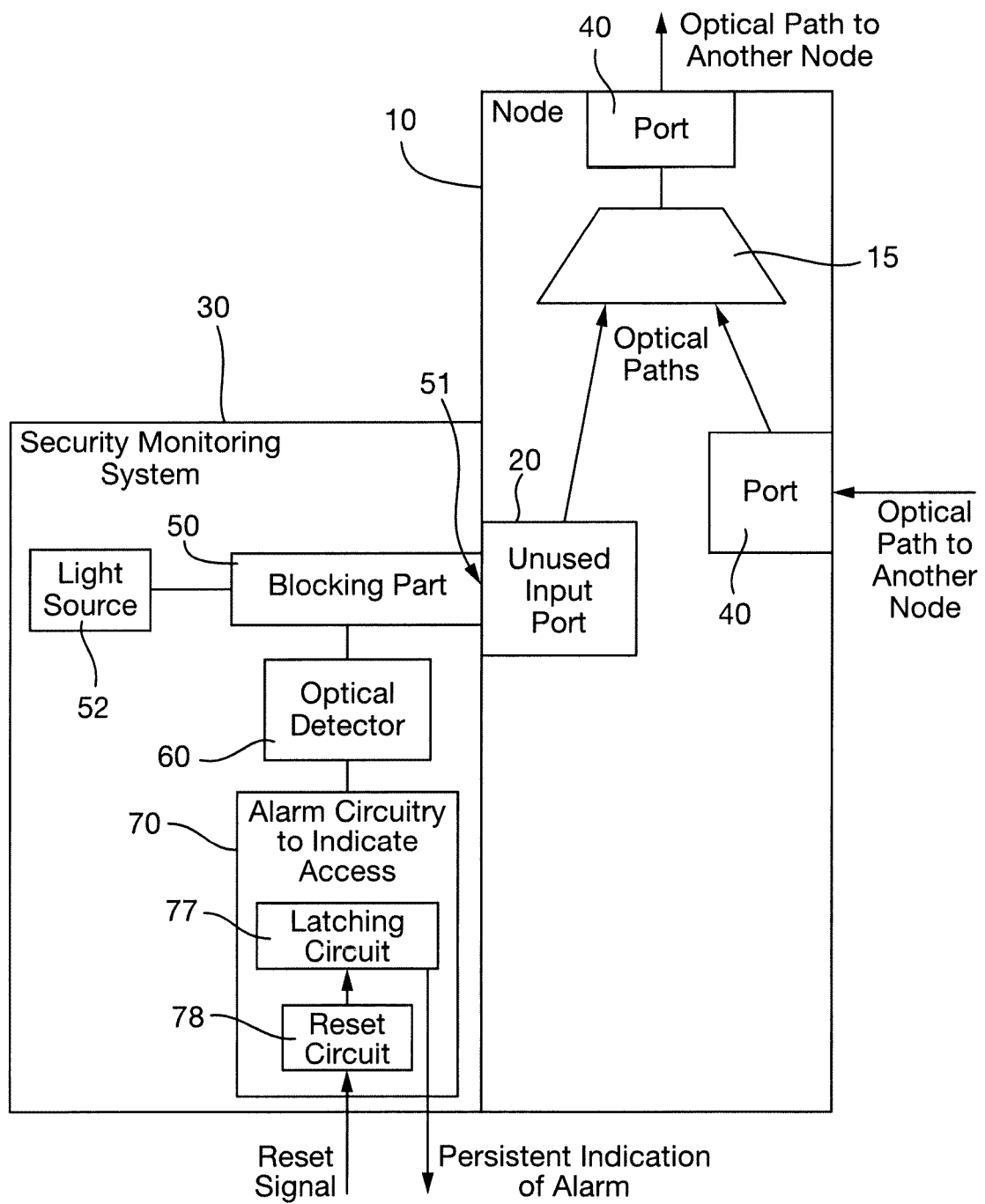
FIG. 6 shows a schematic view of apparatus according to an embodiment having latched alarm signal.

FIG. 6 Embodiment Having Latched Alarm Signal

FIG. 6 shows an embodiment similar to that of FIG. 4 and similar reference signs are used for corresponding features. In FIG. 6 the alarm circuitry 70 has a latching circuit 77 so that a persistent indication of a transient alarm can be output. A reset circuit 78 is provided to reset the latching circuit.

Figure 7:
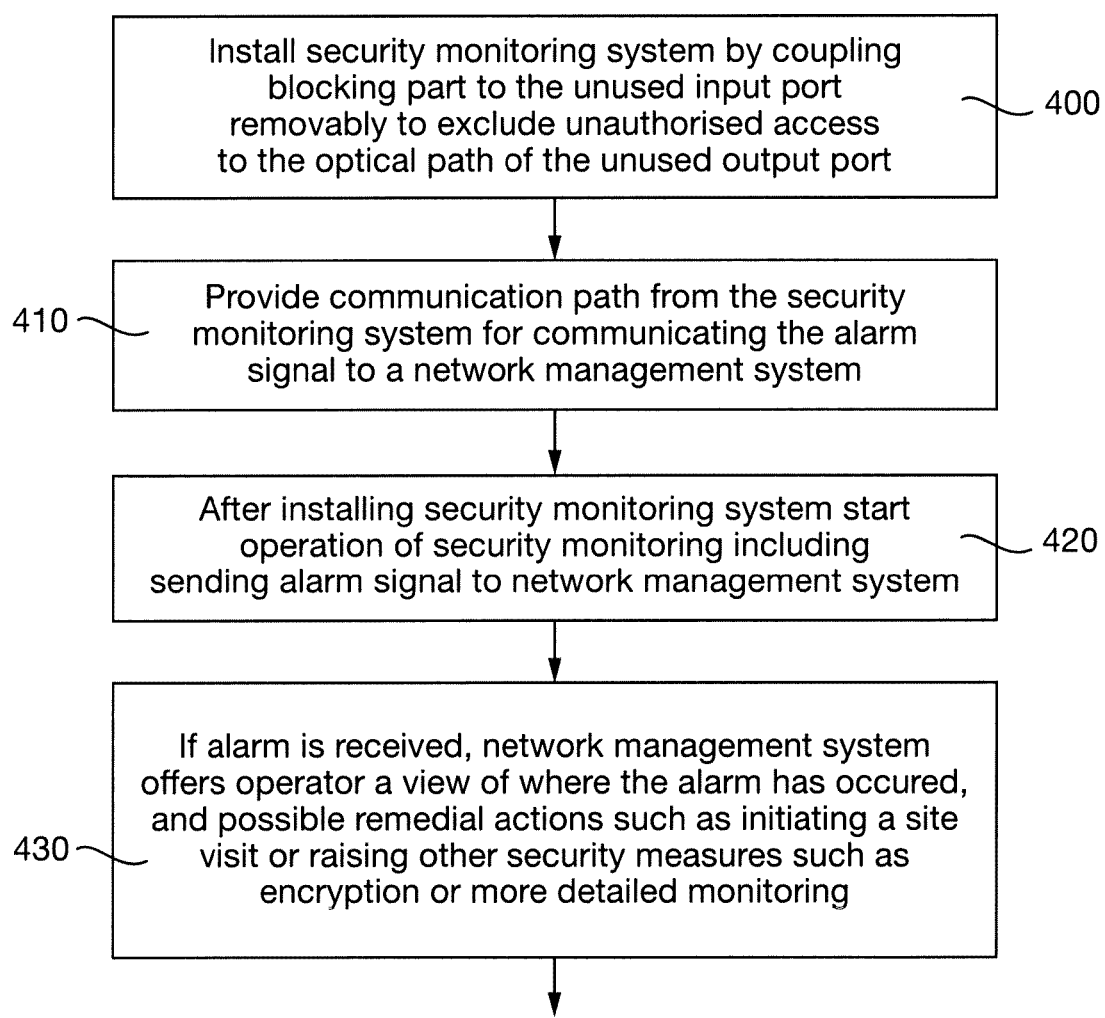
FIG. 7 shows steps in installing a security monitoring system according to an embodiment.

FIG. 7 Installing a Security Monitoring System According to an Embodiment

FIG. 7 shows steps in a method of installing a security monitoring system according to an embodiment. At step 400, the install starts by coupling an interface of a blocking part to an unused input port of the apparatus, removably, and so as to exclude unauthorised access to the optical path of the unused port. At step 410, a communication path is provided from the security monitoring system for communicating the alarm signal to the network management system. This can be remote from the apparatus, at a centralised location or can be local, for example a software agent of a distributed control plane. In some cases, some configuration inputs may be needed, for example to identify which ports are blocked by which of the blocking parts. At step 420, after installing, operation can start, and the monitoring system can start detecting if there is a change in the power of the light reflected back from the interface of the blocking part which would indicate an unauthorised tampering with or removal of the blocking parts. The alarm signal could be sent only when a detection is made, or a signal could be sent periodically to give a positive indication of no detection, or could be sent on request in response to a polling by the management system. At step 430, if an alarm is received, the network management system offers the operator a view on screen indicating where the alarm has occurred and possible remedial actions such as initiating a site visit, rerouting traffic to avoid the location, or raising other security measures such as encryption or more detailed monitoring for example.

Figure 8:
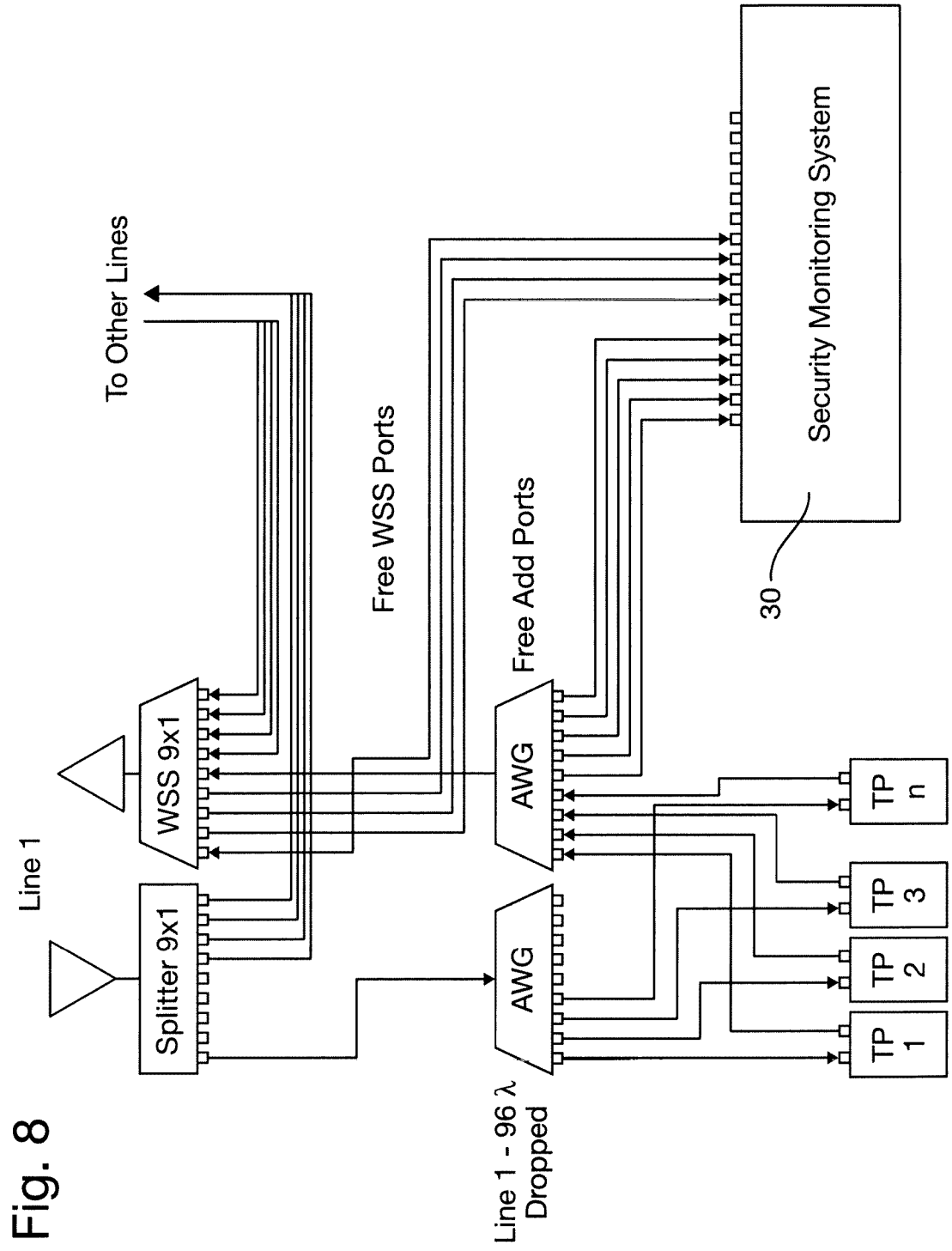
FIG. 8 shows a schematic view of apparatus according to an embodiment in the form of a colored/directional ROADM node.

FIG. 8 Embodiment in the Form of a Colored/Directional ROADM Node

FIG. 8 shows a schematic view of parts of apparatus in the form of a node according to another embodiment in which the security monitoring system 30 is applied to a traditional Colored/Directional ROADM node. One bidirectional optical link (line 1) is shown to and from another node, many other such lines may be provided. Optical amplifiers 510 are provided as input and output interfaces. A splitter 550 splits the incoming optical signal which is typically a WDM signal into 9 identical copies (there may be more or fewer copies in other examples). One of the copies is fed to a drop demultiplexer AWG 500 which separates the n individual wavelengths of the WDM signals and couples each wavelength to a different transponder (TP 1 . . . n) which then outputs an electrical or optical signal to a local client interface. As the AWG may not have the "right" number of outputs to match the desired number of transponders, there may be a number of spare outputs which are unused output ports.

The splitter has 8 other outputs as shown. Four of these are fed to other lines and so are "used". Another four are unused and so are also unused output ports.

The transponders also have incoming signals which are for adding to the WDM signals sent to the other nodes. These are coupled as individual wavelengths from the transponders to AWG multiplexer 505. As there may be fewer transponders than the number of AWG inputs, there may be a number of spare inputs which are unused input ports. The WDM "add" signal from multiplexer 505 is fed to a WSS 540 which selects which wavelengths of the "add" signal are sent out on line 1 together with other wavelengths from other lines. WSS 540 has 8 other inputs. Four of these are fed by other lines and so are "used". Another four are unused and so are unused input ports. The output WDM signal from WSS 540 is fed to an optical amplifier 510 for transmission to the next node. Parts 510, 550 and 540 can be provided for each of the lines served by the node.

Each of the unused input ports are coupled to the security monitoring system so that they are occupied and not vulnerable to unauthorised, undetected traffic disruption. Hence the security monitoring system 30 as shown occupies all the unused WSS ports, and unused multiplexer add ports. However, the security monitoring system 30 may be arranged to protect a smaller number of unused input ports.

If all the unused input ports for a given incoming line are occupied and monitored, this can provide a security capability for that line even if other lines incoming to the same node do not have the same security. The security monitoring system can be arranged to indicate to the network management system which of the lines are secure.

Or, in another example, a subset of the wavelengths can be protected by occupying all the unused combiner ports, but only selected ones of the add ports corresponding to the subset of wavelengths. The security monitoring system can be arranged to indicate to the network management system which of the wavelengths are secure.

Or, if desired, all the unused input ports of the entire node can be occupied and monitored by the security monitoring system. Furthermore, if other points of vulnerability need to be protected, such as manual configuration switches or output ports, if they are physically close to a protected unused input port then the blocking part can be manufactured so as to cover such other points of vulnerability when in position occupying the unused input port. This is better than having separate covers for these other points of vulnerability since there is no need for separate monitoring of tampering of such separate covers.

In a preferred embodiment, the security monitoring system may comprise one or more blocking parts for protecting unused output ports as well as one or more blocking parts for protecting unused input ports as described above. As described in the applicant's earlier unpublished patent application no. PCT/EP2012/060996, a blocking part for protecting an unused output port may be coupled removably to the unused output port to occupy the unused output port so as to exclude any other part from using the unused output port to gain unauthorised access to the optical path of the unused output port. An optical detector is coupled to the blocking part and configured to detect optical signals passing through the unused output port. Further, alarm circuitry is configured to output an alarm signal indicative that the unused output port has been accessed based on the detecting of the optical signals by the optical detector. For example, an alarm signal may be output if a break in the optical signals is sensed, indicating that the blocking part may have been removed from the unused output port and so unauthorised access may have occurred. Thus, in this way, the security monitoring system may be configured to protect all of the unused ports of an entire node from unauthorised access. Alternatively, there may be two separate security monitoring systems, one comprising blocking parts for protecting unused input ports as described above, and another comprising blocking parts for protecting unused output ports.

Figure 9:
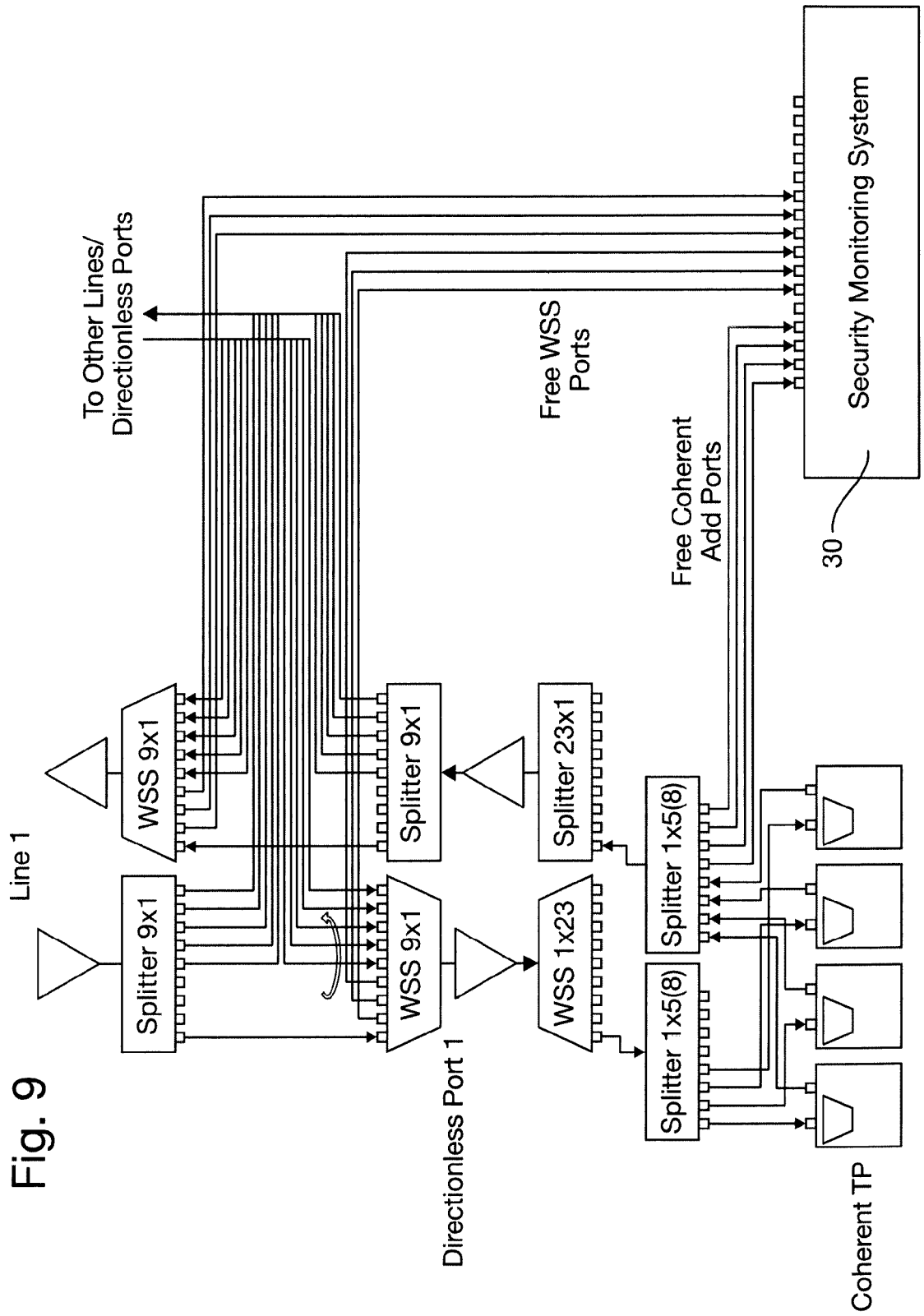
FIG. 9 shows a schematic view of apparatus according to an embodiment in the form of a colored/directional ROADM node.

FIG. 9 Embodiment in the Form of a Colorless/Directionless ROADM Node

FIG. 9 shows a schematic view of parts of apparatus in the form of a node according to another embodiment in which the security monitoring system is applied to a more advanced colorless/directionless architecture. As in FIG. 8, one bidirectional optical link (line 1) is shown to and from another node, many other such lines may be provided. Optical amplifiers 510 are provided as input and output interfaces. A splitter 550 splits the incoming optical signal which is typically a WDM signal into 9 identical copies (there may be more or fewer copies in other examples). One of the copies is fed to an input of WSS 560 of a directionless port 1. Here the WSS 560 selects wavelengths from the WDM inputs from all of the lines and feeds the resulting WDM signal to an optical amplifier 510 then to a WSS 610 where the wavelengths of the WDM signal are selected for output to different coherent transponders 620 which can select from or process the multiple wavelengths. There can be cascaded splitters to provide for more transponders As in FIG. 8 there may be a number of spare outputs of the splitter 550 which are unused output ports, not coupled to other lines. Also there are a number of spare outputs of the WSS 610 which can be unused coherent drop ports. There are also monitoring ports from the optical amplifiers which are also unused. In addition, there may be unused input ports of the WSS 560 which are not coupled to other lines.

The transponders also have incoming signals which are for adding to the WDM signals sent to the other nodes. These can have selectable wavelengths or multiple wavelengths, generated at the coherent transponder. These are combined by a coupler 600 instead of the wavelength multiplexer shown in FIG. 8, assuming that the different inputs do not have overlapping wavelength allocations. Before the coupler 600 there can be a splitter (not shown) to enable the transponders to distribute their incoming signals to other directionless ports within the node. The coupler 600 may have a number of spare input ports which are unused input ports. The resulting WDM signal output by the coupler 600 is fed to a splitter 570 via an optical amplifier 510. The outputs of the splitter are distributed to different ones of the lines. One of them is shown passing to line 1, to an input of WSS 540. This part selects wavelengths from different lines and ports, for output on line 1. There are more outputs of splitter 570 than there are lines and thus three spare outputs are unused output ports. There are also more inputs of WSS 540. Some of these may be "used" by other lines, but some may be unused input ports.

All of the unused input ports are shown coupled to the security monitoring system 30 so that they are occupied and not vulnerable to unauthorised, undetected introduction of disturbing signals. Hence the security monitoring system 30 as shown occupies all the unused combiner ports, and unused multiplexer add ports. It is also possible that the security monitoring system 30 could occupy fewer of the unused input ports.

Several implementations could be adopted, according to node needs and the system architecture. Possible differentiations will be the space and mechanical requirement to manage the connection of all unused input ports. Using a slide-in unit it is reasonable to foresee a limit of up to 40~48 LC connections for a 15 inches single slot card. A pizza-box approach could reach about 80~100 LC connections on a single Rack Unit solution. A possibility to increase the density is to use MTP connectors together with "Hydra" cables, but this will add costs to the solution.

The security monitoring system of preferred embodiments of the present invention can have a relatively simple design. It can be a stand alone box, or be implemented as a module to be inserted into the node for example. It can have a laser source, a passive optical splitter and photodiode array with control electronics to be able to detect the LOS condition, when the connection is closed, and the no LOS condition when the connection is open. A solution with multiple laser and lower splitting ratio or no splitter at all could provide the same performance although at higher a cost. A simpler solution could use just a comparator (analog) or, introducing some AD components, it will be possible to manage different threshold for each port. The use of a microcontroller with dedicated SW allows alarm management and communication with the Network Equipment.

A basic solution could consist of all monitored entities connected by a logical OR wired to a ground contact of the equipment. This would only raise a node access alarm, without indication of the specific port, but could be added without specific development/upgrade on the existing equipment (only the logical assignment of the used ground contact with a security alarm is needed).

Depending on the node architecture, different number of monitoring points may be required. For a fully colourless and directionless solution, based on a broadcast and select architecture (majority of installed WSS based nodes) a limited number of open unprotected ports need to be managed. A solution with 8~16 monitors could fit the requirement. For more complex nodes such as those with fixed non directionless add/drop, they will also have all the free ports of the AWG mux (or other mux technology) to be monitored, since the node pass-through channel will be split and be present at the corresponding demux port. A solution with several tens of monitors may be preferred in these conditions.

Figure 10:
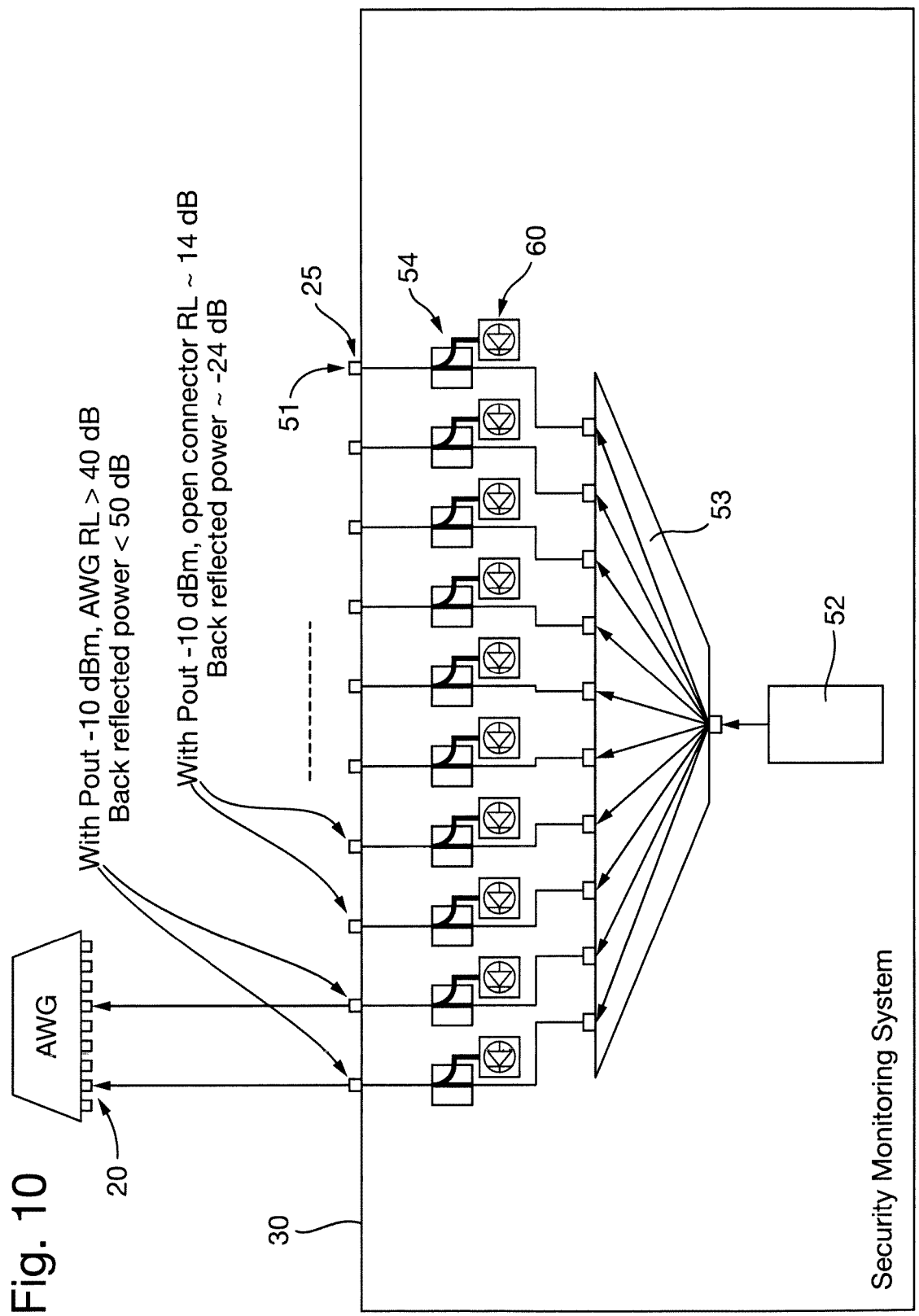
FIG. 10 shows a schematic view of apparatus according to a preferred embodiment.

FIG. 10 Preferred Embodiment of a Security Monitoring System Embodying the Present Invention FIG. 10 illustrates a security monitoring system embodying the present invention comprising a plurality of blocking parts 50 for blocking unused input ports 20 of an AWG 15. In this example there are 10 blocking parts 50 but of course there may be more or less blocking parts 50. Each of the blocking parts 50 comprises a connector 25 for mating with a corresponding connector of one of the unused input ports 20. Each of the connectors 25 comprises an interface 51 for coupling to the respective unused input port 20. Light emitted by a laser source 52 is split by a passive optical splitter 53 into a plurality of portions which are passed along respective optical paths to respective interfaces 51. At the interfaces 51 a portion of the light is transmitted through the interfaces 51, such that, when the connectors 50 are coupled with the unused input ports 20, the transmitted light is coupled into the unused input ports 20. The security monitoring system further comprises a plurality of photodiodes as optical detectors 60 which are each coupled by a respective optical coupler 54 to a respective one of the optical paths. Light reflected back from the respective interfaces 51 travels back along the same optical path from which the light was emitted. When the reflected light reaches an optical coupler 54, the optical coupler 54 couples at least a portion of the reflected light to the photodiode 54 coupled thereto.

As indicated in FIG. 10, if the power of the emitted light at connector 25 is −10 dBM, the power of the light reflected back from the interface 51, when the connector 25 is coupled to the AWG input port, will be approximately less than −50 dB. If the connector 25 is however disconnected from the unused input port 20, the power of the light reflected back from the interface 51 will instead be approximately −24 dB. Thus, by monitoring the power of the light reflected back from interfaces 51, it can be determined whether the blocking parts 50 have been disconnected from the unused input ports 20, and therefore whether unauthorised access may have occurred.

FIGS. 11 and 12 Embodiments of Apparatus Having Features in their Alarm Circuitry FIGS. 11 and 12 show embodiments having particular features in the alarm circuitry. FIG. 11 shows an embodiment similar to that of FIG. 1, and having multiple unused input ports and corresponding blocking parts. Two are shown but there can of course be many more. This embodiment further shows a single light source 52 and a passive optical splitter 53 for splitting the light emitted by the light source 52 into two portions which are coupled to the two blocking parts respectively. Alternatively, there may be a plurality of light sources 52, each for emitting light to be coupled to a respective blocking part 50. The alarm circuitry has a combining circuit 72 for combining signals from different blocking parts. This could be a simple logical OR circuit so that an alarm is sent if any of the blocking parts are tampered with.

FIG. 12 shows an embodiment similar to that of FIG. 11, again having multiple unused input ports, corresponding blocking parts, a single light source 52 and a passive optical splitter 53. But in place of the combining circuit 72 the alarm circuitry has a port ID circuit 74. This enables an alarm signal to be sent if any of the blocking parts are tampered with, but in this case an indication of which port has triggered the alarm is sent. This can be implemented in various ways, one of which involves using a look up table for example. The look up table can be addressed by the incoming signals from the optical detectors, and can output a port ID number. These numbers can be set up at the time of installing the blocking parts, and can be stored in non volatile memory.

Other variations and embodiments can be envisaged within the claims.

The invention claimed is:

1. An apparatus for an optical communications network, the apparatus having at least two optical paths for optical traffic to or from other nodes, the optical paths having respective optical ports, wherein at least one of the optical ports is configured as an unused input port, available for future use for optical traffic, the apparatus comprising a security monitoring system for detecting unauthorised access and having:
    a blocking part comprising an interface coupled removably to the unused input port to occupy the unused input port so as to exclude any other part from using the unused input port to gain unauthorised access to the optical path of the unused input port;
    a light source optically coupled to the interface of the blocking part such that, when the interface is coupled to the unused input port, light can be transmitted through the interface into the unused input port;
    an optical detector arranged to detect light reflected back from the interface of the blocking part; and
    alarm circuitry configured to output an alarm signal indicative that the unused input port has been accessed based on the detecting of reflected light by the optical detector.

2. The apparatus of claim 1, wherein the light source is configured to emit light at a wavelength different from the existing optical traffic in the optical communications network.

3. The apparatus of claim 1, wherein the alarm circuitry is configured to output the alarm signal if the power of the reflected light detected by the optical detector is above a predefined threshold.

4. The apparatus of claim 1, comprising at least one of an optical splitter having an input coupled to the unused input port, and a wavelength multiplexer having an input coupled to the unused input port.

5. The apparatus of claim 1, wherein the at least one unused input port comprises an optical connector and the blocking part comprises a corresponding connector suitable to mate with the optical connector.

6. The apparatus of claim 1, wherein the monitoring system comprises a communications part for sending the alarm signal to a network management part of the network.

7. The apparatus of claim 1, wherein the alarm circuitry comprises a latching circuit configured to maintain a persistent indication of a temporary detection of tampering and a reset circuit for resetting the latching circuit according to an external signal.

8. A security monitoring system for coupling to an unused input port of an optical path of apparatus of an optical network, the apparatus having at least two optical paths for optical traffic to or from other nodes, the optical paths having respective optical ports, wherein at least one of the optical ports is configured as an unused input port, available for future use for optical traffic, the security monitoring system being for detecting unauthorised access and having:
    a blocking part comprising an interface for coupling removably to the unused input port to occupy the unused input port so as to exclude any other part from using the unused input port to gain unauthorised access to the optical path of the unused input port;

a light source optically coupled to the interface of the blocking part such that, when the interface is coupled to the unused input port, light can be transmitted through the interface into the unused input port;

an optical detector arranged to detect light reflected back from the interface of the blocking part; and alarm circuitry configured to output an alarm signal indicative that the unused input port has been accessed based on the detecting of reflected light by the optical detector.

9. The security monitoring system of claim 8, wherein the light source is configured to emit light at a wavelength different from the existing optical traffic in the optical communications network.

10. The security monitoring system of claim 8, wherein the alarm circuitry is configured to output the alarm signal if the power of the reflected light detected by the optical detector is above a predefined threshold.

11. The security monitoring system of claim 8, further comprising a communications part for sending the alarm signal to a network management part of the network.

12. The security monitoring system of claim 8, wherein the alarm circuitry comprises a latching circuit configured to maintain a persistent indication of a temporary detection of tampering and a reset circuit for resetting the latching circuit according to an external signal.

13. The security monitoring system of claim 8, comprising two or more blocking parts, for two or more respective unused input ports, wherein the alarm circuitry is configured to output an alarm signal indicating which of the two or more unused input ports has been accessed.

14. The security monitoring system of claim 8, comprising two or more blocking parts, for two or more respective unused input ports, wherein the alarm circuitry is configured to combine outputs of the optical detectors to output a common alarm signal if access to any of the two or more unused input ports is detected.

15. The security monitoring system of claim 13, further comprising a passive optical splitter arranged to split light emitted by the light source into a plurality of portions for coupling to the two or more blocking parts respectively.

16. The security monitoring system of claim 8, further comprising a second blocking part coupled removably to an unused output port of the apparatus, available for future use for optical traffic, to occupy the unused output port so as to exclude any other part from using the unused output port to gain unauthorised access to the optical path of the unused output port; a second optical detector coupled to the second blocking part and configured to detect optical signals passing through the unused output port; and alarm circuitry configured to output an alarm signal indicative that the unused output port has been accessed based on the detecting of the optical signals by the second optical detector.

17. A method of monitoring security of an optical path to detect unauthorised access to the optical path in apparatus of an optical network, the apparatus having at least two optical paths for optical traffic to or from other nodes, the optical paths having respective optical ports, wherein at least one of the optical ports is configured as an unused input port, available for future use for optical traffic, and the method having the steps of:

coupling an interface of a blocking part to the unused input port so as to exclude any other part from using the unused input port to gain unauthorised access to the optical path of the unused input port;

transmitting light through the interface of the blocking part into the unused input port;

detecting light reflected back from the interface of the blocking part; and outputting an alarm signal indicating whether access has occurred based on the detecting of reflected light.

18. The method of claim 17, further comprising sensing whether power of the reflected light is above a predefined threshold, and outputting the alarm signal according to the sensing.

19. The method of claim 17, further comprising sending the alarm signal to a network management part of the network.

* * * * *